(12) United States Patent
Luo (10) Patent No.: US 11,787,241 B2
(45) Date of Patent: Oct. 17, 2023

(54) TIRE PRESSURE SENSOR IDENTIFICATION METHOD, APPARATUS AND DEVICE

(71) Applicant: AUTEL INTELLIGENT TECHNOLOGY CORP., LTD., Guangdong (CN)

(72) Inventor: Yongliang Luo, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 360 days.

(21) Appl. No.: 17/122,691

(22) Filed: Dec. 15, 2020

(65) Prior Publication Data

US 2021/0101421 A1    Apr. 8, 2021

Related U.S. Application Data

(63) Continuation of application No. PCT/CN2019/090102, filed on Jun. 5, 2019.

(30) Foreign Application Priority Data

Jun. 28, 2018  (CN) .......................... 201810691167.5

(51) Int. Cl.
   *B60C 23/04* (2006.01)

(52) U.S. Cl.
   CPC ...... *B60C 23/0415* (2013.01); *B60C 23/0422* (2013.01)

(58) Field of Classification Search
   CPC ............ B60C 23/0415; B60C 23/0422; B60C 23/0462; B60C 23/0479; B60C 23/0461; B60C 23/0471

USPC ....................................................... 340/425.5
See application file for complete search history.

(56) References Cited

U.S. PATENT DOCUMENTS

| | | | | |
|---|---|---|---|---|
| 9,527,351 | B2 * | 12/2016 | Hsu ....................... | B60C 23/0479 |
| 10,434,827 | B2 * | 10/2019 | Tomakidi .................. | G06F 8/10 |
| 11,345,194 | B2 * | 5/2022 | Yao ...................... | B60C 23/0471 |
| 2008/0252435 | A1 * | 10/2008 | Chien ................. | B60C 23/0408 |
| | | | | 340/447 |
| 2013/0106596 | A1 * | 5/2013 | Mouchet ............. | B60C 23/0472 |
| | | | | 340/445 |

(Continued)

FOREIGN PATENT DOCUMENTS

| CN | 102963219 A | 3/2013 |
|---|---|---|
| CN | 106827975 A | 6/2017 |
| CN | 108891210 A | 11/2018 |

OTHER PUBLICATIONS

International Search Report dated Aug. 15, 2019; PCT/CN2019/090102 with English translation.

*Primary Examiner* — Eric Blount (57) ABSTRACT

The present invention provides a tire pressure sensor identification method, apparatus and device. The method includes: sending an activation signal to a to-be-detected tire pressure sensor, till receiving a feedback signal sent for the activation signal by the to-be-detected tire pressure sensor, where the feedback signal includes feature information of the to-be-detected tire pressure sensor; and identifying the to-be-detected tire pressure sensor according to the feature information. The present invention implements automatic scanning of the tire pressure sensor and can accurately identify the tire pressure sensor according to a scanning result, thereby improving activation efficiency of the tire pressure sensor.

20 Claims, 2 Drawing Sheets

Send an activation signal to a to-be-detected tire pressure sensor, till receiving a feedback signal sent for the activation signal by the to-be-detected tire pressure sensor, where the feedback signal includes feature information of the to-be-detected tire pressure sensor — S101

Identify the to-be-detected tire pressure sensor according to the feature information — S102

(56) References Cited

U.S. PATENT DOCUMENTS

2015/0328943 A1 11/2015 Hsu et al.
2020/0298634 A1* 9/2020 Yao .................... B60C 23/0462

* cited by examiner

FIG. 1

Send an activation signal to a to-be-detected tire pressure sensor, till receiving a feedback signal sent for the activation signal by the to-be-detected tire pressure sensor, where the feedback signal includes feature information of the to-be-detected tire pressure sensor — S101

Identify the to-be-detected tire pressure sensor according to the feature information — S102

TIRE PRESSURE SENSOR IDENTIFICATION METHOD, APPARATUS AND DEVICE

This application is a continuation application of International Application No. PCT/CN2019/090102, filed on Jun. 5, 2019, which claims priority of Chinese Patent Application No. 201810691167.5, filed on Jun. 28, 2018, which is incorporated herein by reference in its entirety.

BACKGROUND

Technical Field

The present application relates to the field of tire monitoring technologies, and in particular, to a tire pressure sensor identification method, apparatus and device.

Related Art

With the improvement of requirements of people for vehicle safety performance, a vehicle tire pressure monitoring technology is developing rapidly.

Currently, tire pressure sensors are configured on more vehicles. However, there is a plurality of types of tire pressure sensors and the tire pressure sensors do not have a unified manufacturing standard. Therefore, it is more difficult to identify the tire pressure sensors. Although many activation tools are developed for different tire pressure sensors, the activation tools cannot automatically identify the tire pressure sensors. To be specific, the activation tools need to activate a tire pressure sensor when a type of the tire pressure sensor or a communications protocol of the tire pressure sensor is learned. For example, during detection, only after a user selects a model year, the type of the tire pressure sensor can be determined, to further activate the tire pressure sensor. In a current implementation, activation efficiency of the activation tools to the tire pressure sensor is low.

SUMMARY

The present invention provides a tire pressure sensor identification method, apparatus and device, to automatically scan a tire pressure sensor and accurately identify the tire pressure sensor, so as to select a suitable activation tool to detect the tire pressure sensor with high detection efficiency.

According to a first aspect, an embodiment of the present invention provides a tire pressure sensor identification method, including:

sending an activation signal to a to-be-detected tire pressure sensor, till receiving a feedback signal sent for the activation signal by the to-be-detected tire pressure sensor, where the feedback signal includes feature information of the to-be-detected tire pressure sensor; and identifying the to-be-detected tire pressure sensor according to the feature information.

Optionally, the activation signal includes a waveform corresponding to a tire pressure sensor.

Optionally, the sending an activation signal to a to-be-detected tire pressure sensor includes:

sending activation signals corresponding to tire pressure sensors in a descending order of market share to the to-be-detected tire pressure sensor successively.

Optionally, before the sending an activation signal to a to-be-detected tire pressure sensor, the method further includes:

receiving identity information of the to-be-detected tire pressure sensor input by a user; and determining an activation signal corresponding to the identity information according to the identity information.

Optionally, the identity information includes vehicle information and/or manufacturer information of the to-be-detected tire pressure sensor.

Optionally, when a quantity of the determined activation signals corresponding to the identity information is greater than 1, the sending an activation signal to a to-be-detected tire pressure sensor includes:

sending activation signals corresponding to tire pressure sensors in a descending order of market share to the to-be-detected tire pressure sensor successively.

Optionally, the identifying the to-be-detected tire pressure sensor according to the feature information includes:

matching the feature information with pre-stored reference feature information; and if the matching is successful, identifying the to-be-detected tire pressure sensor according to identity information of the tire pressure sensor corresponding to the reference feature information.

Optionally, the feature information includes data feature information and sensor status information; and the matching the feature information with pre-stored reference feature information includes:

matching the sensor status information with reference sensor status information in the pre-stored reference feature information; and if the matching is successful, matching the data feature information with reference data feature information in the pre-stored reference feature information.

Optionally, the data feature information includes at least one of the following:

a baud rate, a modulation mode, a packet length, a frame length, a frame header, a frame end, a frame interval and a frame count; and the status information of the tire pressure sensor includes at least one of the following:

a storage mode, a parking mode and a pause mode.

Optionally, the identifying the to-be-detected tire pressure sensor includes:

identifying a type of the to-be-detected tire pressure sensor; or identifying a communications protocol of the to-be-detected tire pressure sensor.

According to a second aspect, an embodiment of the present invention provides a tire pressure sensor identification apparatus, including:

a sending module, configured to send an activation signal to a to-be-detected tire pressure sensor, till a feedback signal sent for the activation signal by the to-be-detected tire pressure sensor is received, wherein the feedback signal comprises feature information of the to-be-detected tire pressure sensor; and an identification module, configured to identify the to-be-detected tire pressure sensor according to the feature information.

Optionally, the activation signal includes a waveform corresponding to a tire pressure sensor.

Optionally, the sending module is specifically configured to:

send activation signals corresponding to tire pressure sensors in a descending order of market share to the to-be-detected tire pressure sensor successively.

Optionally, the apparatus further includes:

a receiving module, configured to receive identity information of the to-be-detected tire pressure sensor input by a user before the activation signal is sent to the to-be-detected tire pressure sensor; and determine an activation signal corresponding to the identity information according to the identity information.

Optionally, the identity information includes vehicle information and/or manufacturer information of the to-be-detected tire pressure sensor.

Optionally, the sending module is further configured to send activation signals corresponding to tire pressure sensors in a descending order of market share to the to-be-detected tire pressure sensor successively when a quantity of the determined activation signals corresponding to the identity information is greater than 1.

Optionally, the identification module is specifically configured to:

match the feature information with pre-stored reference feature information; and if the matching is successful, identify the to-be-detected tire pressure sensor according to identity information of the tire pressure sensor corresponding to the reference feature information.

Optionally, the feature information includes data feature information and sensor status information; and the identification module is specifically configured to:

match the sensor status information with reference sensor status information in the pre-stored reference feature information; and if the matching is successful, match the data feature information with reference data feature information in the pre-stored reference feature information.

Optionally, the data feature information includes at least one of the following:

a baud rate, a modulation mode, a packet length, a frame length, a frame header, a frame end, a frame interval and a frame count; and the status information of the tire pressure sensor includes at least one of the following:

a storage mode, a parking mode and a pause mode.

Optionally, the identification module is specifically configured to:

identify a type of the to-be-detected tire pressure sensor; or identify a communications protocol of the to-be-detected tire pressure sensor.

According to a third aspect, an embodiment of the present invention provides a tire pressure sensor identification device, including:

a memory, configured to store a program;

a processor, configured to execute the program stored in the memory, wherein when the program is executed, the processor is configured to perform the method according to the first aspect.

According to a fourth aspect, an embodiment of the present invention provides a computer-readable storage medium, including a computer program, where when run in a computer, the computer program causes the computer to perform the method according to the first aspect.

The present invention provides a tire pressure sensor identification method, apparatus and device. An activation signal is sent to a to-be-detected tire pressure sensor, till a feedback signal sent for the activation signal by the to-be-detected tire pressure sensor is received, where the feedback signal includes feature information of the to-be-detected tire pressure sensor; and the to-be-detected tire pressure sensor is identified according to the feature information. The present invention implements automatic scanning of the tire pressure sensor and can accurately identify the tire pressure sensor according to a scanning result, thereby improving activation efficiency of the tire pressure sensor.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments in the present invention without creative efforts shall fall within the protection scope of the present invention.

In the specification, claims, and accompanying drawings of the present invention, the terms "first", "second", "third", "fourth", and so on (if any) are intended to distinguish between similar objects but do not necessarily indicate a specific order or sequence. It should be understood that the data used in this way may be exchanged with each other in proper situation, for ease of describing the embodiments of the present invention. For example, the data may be implemented in other orders than that is shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The following describes technical solutions of the present invention in detail with reference to specific embodiments. The following several specific embodiments may be combined with each other, and same or similar concepts or processes may not be repeatedly described in some embodiments.

In the following, some terms in the present application are described, so as to help persons skilled in the art have a better understanding:

1) A tire pressure monitoring system (TPMS) may automatically monitor each status of a tire by recording a rotate speed of the tire or a tire pressure sensor mounted in the tire, to provide effective safety for driving.

2) Original equipment manufacturer number (OEM Part NO) refers to original part number.

3) A microcontroller unit (MCU), also referred to as a single chip microcomputer or a single chip machine, makes proper reduction for frequency and size of a central processing unit (CPU) and integrates periphery interfaces such as a memory, a timer, an universal serial bus (USB), an analog to digital (A/D) converter, an universal asynchronous receiver/transmitter, and a programmable logic controller (PLC), and even a drive circuit of a liquid crystal display (LCD) into a single chip to form a chip-level computer, to make different combination controls for different application scenarios.

Figure 1:
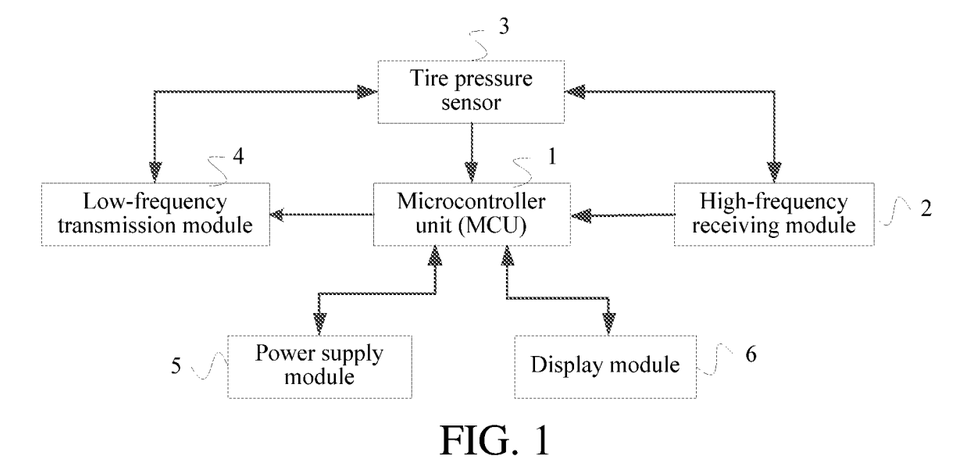
FIG. 1 is a schematic structural diagram of a tire pressure sensor identification device according to an embodiment of the present application.

FIG. 1 is a schematic structural diagram of a tire pressure sensor identification device according to an embodiment of the present application. As shown in FIG. 1, the recognition device includes an MCU 1. The MCU 1 is electrically connected to a high-frequency receiving module 2, a tire pressure sensor 3, a low-frequency transmission module 4, a power supply module 5 and a display module 6. The power supply module 5 is configured to supply power for the MCU 1. The low-frequency transmission module 4 is configured to send a low-frequency activation signal to the tire pressure sensor 3 according to a control signal of the MCU 1. The high-frequency receiving module 2 is configured to receive high-frequency data sent by the tire pressure sensor and transmit the high-frequency data to the MCU 1. The display module is configured to display information read from the tire pressure sensor after the tire pressure sensor is activated.

Specifically, when a low-frequency signal sent by the low-frequency transmission module 4 matches an activation waveform of the tire pressure sensor 3, the tire pressure sensor 3 sends corresponding high-frequency data. The high-frequency data is received by the high-frequency receiving module 2 and transmitted to the MCU 1 for analyzing. The MCU 1 may obtain feature information of the corresponding tire pressure sensor 3 according to the received high-frequency data and identifies the to-be-detected tire pressure sensor according to the feature information.

In this embodiment of the present application, the tire pressure sensor identification device may further implement an activation function, a programming function and the like of the tire pressure sensor after identifying the tire pressure sensor, which is not limited herein. The tire pressure sensor identification device may also be referred to as an activation tool or a programming tool, or the tire pressure sensor identification device may be integrated into an activation tool or a programming tool, which is not limited herein.

The following describes the technical solutions of the present invention and how the technical solutions of the present application resolve the foregoing technical problems in detail with reference to specific embodiments. The following several specific embodiments may be combined with each other, and a same or similar concept or process may not be described repeatedly in some embodiments. The following describes the embodiments of the present invention with reference to the accompanying drawings.

Figure 2:
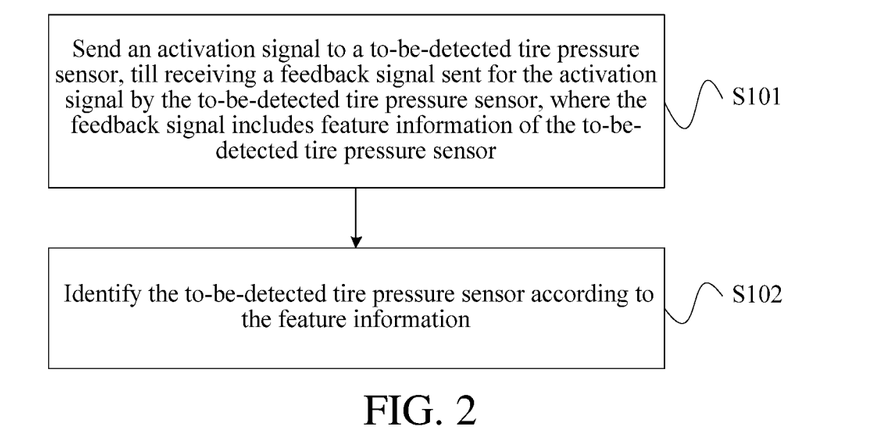
FIG. 2 is a flowchart of a tire pressure sensor identification method according to Embodiment 1 of the present invention.

FIG. 2 is a flowchart of a tire pressure sensor identification method according to Embodiment 1 of the present invention. As shown in FIG. 2, the method in this embodiment may include:

S101. Send an activation signal to a to-be-detected tire pressure sensor, till receiving a feedback signal sent for the activation signal by the to-be-detected tire pressure sensor, where the feedback signal includes feature information of the to-be-detected tire pressure sensor.

In this embodiment, an MCU may be adopted to send the activation signal to the tire pressure sensor according to a preset policy. The tire pressure sensor can only be activated by an activation signal having a corresponding waveform and sends a feedback signal for the activation signal. It should be noted that a quantity of waveforms corresponding to the tire pressure sensor is not limited in this embodiment. One tire pressure sensor may correspond to one or more waveforms. Generally, activation waveforms of different tire pressure sensor manufacturers are different. Therefore, there may also be a correspondence between the activation waveforms and the tire pressure sensor manufacturers. Therefore, the MCU may obtain an activation waveform corresponding to different pre-stored tire pressure sensors from a local memory or obtain an activation waveform corresponding to different tire pressure sensors from a cloud after connected to the Internet; and then generate a corresponding activation signal according to the activation waveform to activate the to-be-detected tire pressure sensor. The to-be-detected tire pressure sensor sends a feedback signal to the MCU when a waveform of the activation signal sent by the MCU is consistent with a waveform of a target activation signal of the to-be-detected tire pressure sensor.

In an implementation, the activation signal may be a low-frequency signal. The MCU may send the activation signal, that is, the low-frequency signal, to the to-be-detected tire pressure sensor by controlling a low-frequency transmission module.

Herein, when sending the activation signal to the to-be-detected tire pressure sensor, the MCU may broadcast the activation signal through the low-frequency transmission module, so that the to-be-detected tire pressure sensor may receive the activation signal, or the MCU may directly send the activation signal to the tire pressure sensor through the low-frequency transmission module.

In an implementation, the MCU sends activation signals corresponding to tire pressure sensors in a descending order of market share to the to-be-detected tire pressure sensor.

Specifically, the MCU obtains activation waveforms corresponding to different tire pressure sensors in the market and generates activation signals corresponding to the activation waveforms; and then sends the activation signals to the to-be-detected tire pressure sensor successively according to a sequence of the market share of the different tire pressure sensors, till receiving the feedback signal sent by the to-be-detected tire pressure sensor. The MCU generates the activation signals corresponding to the activation waveforms through the low-frequency transmission module.

In this embodiment, the corresponding activation signals are generated in the sequence of the market share of the different tire pressure sensors. In theory, a probability that a vehicle uses a tire pressure sensor having a larger market share is the largest. Therefore, to shorten a scanning time of the to-be-detected tire pressure sensor, the activation signal is generated according to an activation waveform corresponding to a tire pressure sensor having the largest market share, and then the activation signal is sent to the to-be-detected tire pressure sensor, to improve identification efficiency of the tire pressure sensor.

In another implementation, before sending the activation signal to the to-be-detected tire pressure sensor, the MCU may receive identity information of the to-be-detected tire pressure sensor input by a user, and then determine the activation signal corresponding to the identity information according to the identity information.

Specifically, when the MCU sends the activation signals to the to-be-detected tire pressure sensor successively according to the sequence of the market share of the different tire pressure sensors without receiving the feedback signal, or the MCU may prompt the user to input the identity information of the to-be-detected tire pressure sensor before sending the activation signal. For example, the MCU prompts the user to input the identity information through a display module to reduce a matching range or increase a matching speed. The MCU may receive the identity information input by the user through an input module. After the MCU receives the identity information of the to-be-detected tire pressure sensor input by the user, there may be the following two cases:

In a first case, the identity information of the to-be-detected tire pressure sensor corresponds to a unique activation signal. In this case, the activation signal is sent to the to-be-detected tire pressure sensor.

In a second case, a quantity of the activation signals corresponding to the identity information of the to-be-detected tire pressure sensor is greater than 1. In this case, the activation signals corresponding to the tire pressure sensors in a descending order of market share are sent successively to the to-be-detected tire pressure sensor.

In this embodiment, the identity information may be vehicle information and/or manufacturer information of the to-be-detected tire pressure sensor.

The vehicle information may include information such as a vehicle type and a vehicle model. Tire pressure sensors may be mounted on a vehicle before leaving the factory, this type of tire pressure sensors may also be referred to as original sensors. Therefore, a microcontroller sensor may determine a model or a specification of the tire pressure sensor or limit a model range of the tire pressure sensor according to the vehicle information, to further determine activation information for the tire pressure sensor, so that sending accuracy of the activation signal can be improved, further improving the identification efficiency of the tire pressure sensor.

The manufacturer information of the tire pressure sensor may include information such as a manufacturer identifier and a batch number. Similarly, the model (also referred to as a type) or the specification of the tire pressure sensor is determined or the model range of the tire pressure sensor is limited according to the manufacturer information, to further determine activation information for the tire pressure sensor, so that sending accuracy of the activation signal can be improved, further improving the identification efficiency of the tire pressure sensor.

In this embodiment, a scanning range may be reduced by setting a scanning condition, thereby accelerating a scanning process for the to-be-detected tire pressure sensor. In this embodiment, a quantity of the activation waveforms is limited by the vehicle information input by the user and/or the manufacturer information of the to-be-detected tire pressure sensor.

In another implementation, the MCU receives a part number of the to-be-detected tire pressure sensor input by the user through an electrically connected user interaction module; obtains an activation waveform corresponding to the part number of the to-be-detected tire pressure sensor according to the part number of the to-be-detected tire pressure sensor; and after generating an activation signal corresponding to the activation waveform, sends the activation signal to the to-be-detected tire pressure sensor.

In this embodiment, a type of the corresponding tire pressure sensor and a suitable activation tool may be directly obtained according to the part number of the tire pressure sensor. Therefore, when learning the part number of the to-be-detected tire pressure sensor, the MCU may directly generate a corresponding activation signal according to the part number of the to-be-detected tire pressure sensor input by the user, to scan the to-be-detected tire pressure sensor.

S102. Identify the to-be-detected tire pressure sensor according to the feature information.

In an implementation, the feature information may be matched with pre-stored reference feature information; and if the matching is successful, the to-be-detected tire pressure sensor is identified according to the identity information of the tire pressure sensor corresponding to the reference feature information.

In another implementation, the feature information may include data feature information and sensor status information. In this case, the sensor status information may be matched with reference sensor status information in the pre-stored reference feature information; and if the matching is successful, the data feature information is further matched with reference data feature information in the pre-stored reference feature information.

The data feature information may include at least one of: a baud rate, a modulation mode, a packet length, a frame length, a frame header, a frame end, a frame interval and a frame count. The status information of the tire pressure sensor includes at least one of: a storage mode, a parking mode and a pause mode.

Specifically, the baud rate is also referred to as a modulation rate. The baud rate refers to a modulation rate of a data signal to a carrier and is represented by a quantity of times of changes of a carrier modulation status in unit time, measured in baud. The modulation mode includes frequency modulation, amplitude modulation and phase modulation. The packet length refers to bytes included in a data packet and is used to indicate a size of the data packet. The frame length refers to a length of a data frame. The data frame is a protocol data unit of a data link layer. The data frame includes a frame header, a data part and a frame end. The frame header and the frame end include some necessary control information, such as synchronization information, address information and error control information. The frame interval may be represented by a transmission time difference between adjacent data frames or may be represented by a quantity of P frames spaced between adjacent data frames. The frame count may be a quantity of input frames counted in 1 second.

Optionally, the type of the to-be-detected tire pressure sensor may be identified or the communications protocol of the to-be-detected tire pressure sensor may be identified. When the type of the to-be-detected tire pressure sensor or the communications protocol of the to-be-detected tire pressure sensor is known, the corresponding activation signal may be determined.

In this embodiment, the feature information is compared with the reference feature information of different pre-stored tire pressure sensors one by one, till the type or the communications protocol of the tire pressure sensor corresponding to the reference feature information that completely matches the feature information is obtained.

Specifically, the status information of the tire pressure sensor is represented by a status word corresponding to the status information, for example, the status word of the tire pressure sensor may be used to represent the status in which the tire pressure sensor is currently in. Specifically, it is assumed that character strings AA, BB and CC respectively represent that the tire pressure sensor is in the storage mode, the parking mode and the pause mode. Different tire pressure sensors represent the three modes by using different status words. Therefore, the different tire pressure sensors may be distinguished according to the corresponding status words when the to-be-detected tire pressure sensors are in the storage mode, the parking mode and the pause mode. The storage mode indicates that the tire pressure sensor has established a communications connection with the MCU through a data line. In this case, the tire pressure sensor is similar to an external memory, and the MCU may read data in the tire pressure sensor. The parking mode refers to a working mode of the tire pressure sensor when a vehicle is in a parking status. The pause mode refers to a working mode when the tire pressure sensor is suspended.

Certainly, the status information of the tire pressure sensor may further include other modes, such as a travelling mode and a moving mode.

In an implementation, the status of the tire pressure sensor may be first determined according to the status information of the tire pressure sensor. When the tire pressure sensor is determined to be in any of the storage mode, the parking mode and the pause mode, the tire pressure sensor may further be identified according to the data feature information. If the tire pressure sensor is determined to be not in any of the foregoing statuses, the tire pressure sensor is not identified, and further the user may be prompted that the tire pressure sensor cannot be identified or the identification fails.

The data feature information is matched with the preset reference feature information, and if the matching is successful, information such as the type, a specification and an identifier of the tire pressure sensor may be determined. After the tire pressure sensor is identified, other data sent by the tire pressure sensor, such as tire pressure information and temperature information fed back by the tire pressure sensor, battery information of the tire pressure sensor and matching vehicle model information, may further be parsed.

Further, the type of the to-be-detected tire pressure sensor may be identified according to unique identification number (ID) information of the tire pressure sensor. The unique ID information of the tire pressure sensor includes a start position of the ID and length information. The type and the communications protocol of the tire pressure sensor and the to-be-detected tire pressure sensor may be determined when the ID information of the tire pressure sensor is obtained.

Specifically, it is assumed that the feature information includes N features, where N is a natural number greater than or equal to 1. The reference feature information of the different pre-stored tire pressure sensors includes M features, where M is greater than or equal to N. If N features found from the M features of the reference feature information all match the N features of the feature information, the type of the tire pressure sensor corresponding to the reference feature information is used as a scanning result of the to-be-detected tire pressure sensor.

In this embodiment, an activation signal is sent to a to-be-detected tire pressure sensor, till a feedback signal sent for the activation signal by the to-be-detected tire pressure sensor is received, where the feedback signal includes feature information of the to-be-detected tire pressure sensor; and the to-be-detected tire pressure sensor is identified according to the feature information. The present invention implements automatic scanning of the tire pressure sensor and can accurately identify the tire pressure sensor according to a scanning result, thereby improving activation efficiency of the tire pressure sensor.

Figure 3:
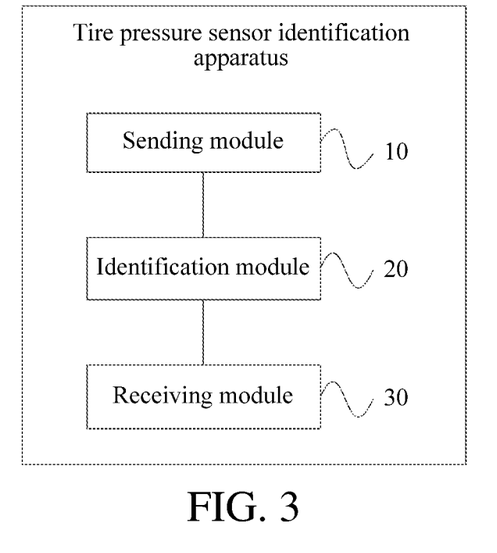
FIG. 3 is a schematic structural diagram of a tire pressure sensor identification apparatus according to Embodiment 2 of the present invention.

FIG. 3 is a schematic structural diagram of a tire pressure sensor identification apparatus according to Embodiment 2 of the present invention. As shown in FIG. 3, the apparatus in this embodiment may include:

a sending module 10, configured to send an activation signal to a to-be-detected tire pressure sensor, till a feedback signal sent for the activation signal by the to-be-detected tire pressure sensor is received, where the feedback signal includes feature information of the to-be-detected tire pressure sensor; and an identification module 20, configured to identify the to-be-detected tire pressure sensor according to the feature information.

Optionally, the activation signal includes a waveform corresponding to the tire pressure sensor.

Optionally, the sending module is specifically configured to:

send activation signals corresponding to tire pressure sensors in a descending order of market share to the to-be-detected tire pressure sensor successively.

Optionally, the apparatus further includes:

a receiving module 30, configured to receive identity information the to-be-detected tire pressure sensor input by a user before the activation signal is sent to the to-be-detected tire pressure sensor; and determine an activation signal corresponding to the identity information according to the identity information.

Optionally, the identity information includes vehicle information and/or manufacturer information of the to-be-detected tire pressure sensor.

Optionally, the sending module 10 is further configured to send activation signals corresponding to tire pressure sensors in a descending order of market share to the to-be-detected tire pressure sensor successively when a quantity of the determined activation signals corresponding to the identity information is greater than 1.

Optionally, the identification module 20 is specifically configured to:

match the feature information with pre-stored reference feature information; and if the matching is successful, identify the to-be-detected tire pressure sensor according to identity information of the tire pressure sensor corresponding to the reference feature information.

Optionally, the feature information includes data feature information and sensor status information; and the identification module 20 is specifically configured to:

match the sensor status information with reference sensor status information in the pre-stored reference feature information; and if the matching is successful, match the data feature information with reference data feature information in the pre-stored reference feature information.

Optionally, the data feature information includes at least one of the following:

a baud rate, a modulation mode, a packet length, a frame length, a frame header, a frame end, a frame interval and a frame count; and the status information of the tire pressure sensor includes at least one of the following:

a storage mode, a parking mode and a pause mode.

Optionally, the identification module 20 is specifically configured to:

identify a type of the to-be-detected tire pressure sensor; or identify a communications protocol of the to-be-detected tire pressure sensor.

This embodiment may execute the technical solutions in the method shown in FIG. 2. An implementation process and a technical effect are similar to those in the foregoing method, and are not described herein again.

An embodiment of the present invention further provides a tire pressure sensor identification device. Referring to FIG. 1, the MCU 1 may further be another processor (such as a single chip machine, a programmable logic controller, a central processing unit) having a computing and analyzing function. The processor is in a communications connection with a memory. The memory stores a computer program, an instruction, data and the like. The processor may invoke the computer program, instruction, data and the like in the memory. The processor is electrically connected to a high-frequency receiving module, a tire pressure sensor, a low-frequency transmission module, a power supply module and a display module. The power supply module is configured to supply power for the processor. The low-frequency transmission module is configured to send a low-frequency activation signal to the tire pressure sensor according to a control signal of the processor. The high-frequency receiving module is configured to receive high-frequency data sent by the tire pressure sensor and transmit the high-frequency data to the processor. The display module is configured to display information read from the tire pressure sensor after the tire pressure sensor is activated.

Specifically, when a low-frequency signal sent by the low-frequency transmission module matches an activation waveform of the tire pressure sensor, the tire pressure sensor sends corresponding high-frequency data. The high-frequency data is received by the high-frequency receiving module and transmitted to the processor for analyzing. The processor may obtain feature information of the corresponding tire pressure sensor according to the received high-frequency data and identifies the to-be-detected tire pressure sensor according to the feature information.

In this embodiment, when invoked by the processor, the computer program and/or instruction in the memory may perform the technical solutions in the foregoing method shown in FIG. 2. An implementation process and a technical effect are similar to those the foregoing method, and are not described herein again.

In addition, an embodiment of the present application further provides a computer-readable storage medium. The computer-readable storage medium stores a computer execution instruction, and when at least one processor of user equipment executes the computer execution instruction, the user equipment performs the foregoing several possible methods.

The computer-readable medium includes a computer storage medium and a communications medium, where the communications medium includes any medium that enables a computer program to be transmitted from one place to another. The storage medium may be any available medium accessible to a general-purpose or special-purpose computer. An exemplary storage medium is coupled to the processor, so that the processor can read information from the storage medium and can write information into the storage medium. Certainly, the storage medium may be a component of the processor. The processor and the storage medium may be located in an ASIC. In addition, the ASIC may be located in the user equipment. Certainly, the processor and the storage medium may alternatively exist in a communications device as discrete components.

Persons of ordinary skill in the art may understand that all or some of the steps of the method embodiments may be implemented by a program instructing relevant hardware. The program may be stored in a computer-readable storage medium. When the program is executed, the steps of the method embodiments are performed. The storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A tire pressure sensor identification method, comprising:
sending an activation signal to a to-be-detected tire pressure sensor, till receiving a feedback signal sent for the activation signal by the to-be-detected tire pressure sensor, wherein the feedback signal comprises feature information of the to-be-detected tire pressure sensor; and
identifying the to-be-detected tire pressure sensor according to the feature information;
wherein the feature information comprises data feature information and sensor status information.

2. The method according to claim 1, wherein the activation signal comprises a waveform corresponding to a tire pressure sensor.

3. The method according to claim 1, wherein the sending an activation signal to a to-be-detected tire pressure sensor comprises:
sending activation signals corresponding to tire pressure sensors in a descending order of market share to the to-be-detected tire pressure sensor successively.

4. The method according to claim 1, wherein before the sending an activation signal to a to-be-detected tire pressure sensor, the method further comprises:
receiving identity information of the to-be-detected tire pressure sensor input by a user; and
determining an activation signal corresponding to the identity information according to the identity information.

5. The method according to claim 4, wherein the identity information comprises vehicle information and/or manufacturer information of the to-be-detected tire pressure sensor.

6. The method according to claim 4, wherein when a quantity of the determined activation signals corresponding to the identity information is greater than 1, the sending an activation signal to a to-be-detected tire pressure sensor comprises:
sending activation signals corresponding to tire pressure sensors in a descending order of market share to the to-be-detected tire pressure sensor successively.

7. The method according to claim 1, wherein the identifying the to-be-detected tire pressure sensor according to the feature information comprises:
matching the feature information with pre-stored reference feature information; and
if the matching is successful, identifying the to-be-detected tire pressure sensor according to identity information of the tire pressure sensor corresponding to the reference feature information.

8. The method according to claim 7, wherein
the matching the feature information with pre-stored reference feature information comprises:
matching the sensor status information with reference sensor status information in the pre-stored reference feature information; and
if the matching is successful, matching the data feature information with reference data feature information in the pre-stored reference feature information.

9. The method according to claim 8, wherein
the data feature information comprises at least one of the following:
a baud rate, a modulation mode, a packet length, a frame length, a frame header, a frame end, a frame interval and a frame count; and
the status information of the tire pressure sensor comprises at least one of the following:
a storage mode, a parking mode and a pause mode.

10. The method according to claim 1, wherein the identifying the to-be-detected tire pressure sensor comprises:
identifying a type of the to-be-detected tire pressure sensor; or
identifying a communications protocol of the to-be-detected tire pressure sensor.

11. A tire pressure sensor identification apparatus, comprising:
a sending module, configured to send an activation signal to a to-be-detected tire pressure sensor, till a feedback signal sent for the activation signal by the to-be-detected tire pressure sensor is received, wherein the feedback signal comprises feature information of the to-be-detected tire pressure sensor; and
an identification module, configured to identify the to-be-detected tire pressure sensor according to the feature information;
wherein the feature information comprises data feature information and sensor status information.

12. The apparatus according to claim 11, wherein the activation signal comprises a waveform corresponding to a tire pressure sensor.

13. The apparatus according to claim 11, wherein the sending module is specifically configured to:
send activation signals corresponding to tire pressure sensors in a descending order of market share to the to-be-detected tire pressure sensor successively.

14. The apparatus according to claim 11 further comprising:
a receiving module, configured to receive identity information of the to-be-detected tire pressure sensor input by a user before the activation signal is sent to the to-be-detected tire pressure sensor; and
determine an activation signal corresponding to the identity information according to the identity information.

15. The apparatus according to claim 14, wherein the identity information comprises vehicle information and/or manufacturer information of the to-be-detected tire pressure sensor.

16. The apparatus according to claim 14, wherein the sending module is further configured to send activation signals corresponding to tire pressure sensors in a descending order of market share to the to-be-detected tire pressure sensor successively when a quantity of the determined activation signals corresponding to the identity information is greater than 1.

17. The apparatus according to claim 11, wherein the identification module is specifically configured to:
match the feature information with pre-stored reference feature information; and
if the matching is successful, identify the to-be-detected tire pressure sensor according to identity information of the tire pressure sensor corresponding to the reference feature information.

18. The apparatus according to claim 17,
the identification module is specifically configured to:
match the sensor status information with reference sensor status information in the pre-stored reference feature information; and
if the matching is successful, match the data feature information with reference data feature information in the pre-stored reference feature information.

19. The apparatus according to claim 18, wherein
the data feature information comprises at least one of the following:
a baud rate, a modulation mode, a packet length, a frame length, a frame header, a frame end, a frame interval and a frame count; and
the status information of the tire pressure sensor comprises at least one of the following:
a storage mode, a parking mode and a pause mode.

20. The apparatus according to claim 11, wherein the identification module is specifically configured to:
identify a type of the to-be-detected tire pressure sensor; or
identify a communications protocol of the to-be-detected tire pressure sensor.

* * * * *